United States Patent
Downing et al.

(10) Patent No.: US 9,766,905 B2
(45) Date of Patent: Sep. 19, 2017

(54) FLEXIBLE PLURALIZATION OF LOCALIZED TEXT

(71) Applicant: MICROSOFT TECHNOLOGY LICENSING, LLC, Redmond, WA (US)

(72) Inventors: Joe Downing, Redmond, WA (US); Noam Chitayat, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 597 days.

(21) Appl. No.: 13/847,718

(22) Filed: Mar. 20, 2013

(65) Prior Publication Data
US 2014/0289616 A1  Sep. 25, 2014

(51) Int. Cl.
G06F 17/00 (2006.01)
G06F 9/44 (2006.01)
G06F 17/28 (2006.01)

(52) U.S. Cl.
CPC ........ *G06F 9/4448* (2013.01); *G06F 17/2881* (2013.01)

(58) Field of Classification Search
CPC ...... G06F 17/21; G06F 17/289; G06F 9/4448; G06F 17/2881
USPC ................................. 715/256, 264
See application file for complete search history.

(56) References Cited

U.S. PATENT DOCUMENTS

| | | | | |
|---|---|---|---|---|
| 6,492,995 B1 * | 12/2002 | Atkin | ............ | G06F 3/0486 715/703 |
| 6,513,002 B1 * | 1/2003 | Gillam | ............ | G06F 17/273 704/257 |
| 6,964,014 B1 * | 11/2005 | Parish | ............ | G06F 17/3089 704/260 |
| 7,089,494 B1 * | 8/2006 | Burrell | ............ | G06F 17/2217 715/207 |
| 7,120,862 B1 * | 10/2006 | Ong | ............ | G06F 17/30864 707/999.003 |
| 7,542,958 B1 * | 6/2009 | Warren | ............ | G06F 17/3089 706/48 |
| 7,752,222 B1 * | 7/2010 | Cierniak | ............ | G06F 17/30864 707/769 |
| 7,840,601 B2 * | 11/2010 | Bicker | ............ | G06F 17/245 707/791 |

(Continued)

FOREIGN PATENT DOCUMENTS

| | | |
|---|---|---|
| CN | 1533163 A | 9/2004 |
| WO | 2012154755 A2 | 11/2012 |

OTHER PUBLICATIONS

Hogan et al., Adopting Standards-based XML File Formats in Open Source Localisation, Google 2005, pp. 9-23.*

(Continued)

*Primary Examiner* — Cong-Lac Huynh
(74) *Attorney, Agent, or Firm* — Alleman Hall Creasman & Tuttle LLP (57) ABSTRACT

One embodiment provides machine-readable memory encoding a localization resource for a computer system. The resource comprises an array of delimited strings, each string including a range to be compared to a content limiter by the computer system. Associated with the range is text to be presented on a user interface of the computer system if the content limiter is within the range.

19 Claims, 6 Drawing Sheets

(56) References Cited

U.S. PATENT DOCUMENTS

| | | | | |
|---|---|---|---|---|
| 7,983,895 B2* | 7/2011 | Mcentee | ............ | G06F 9/4448 704/2 |
| 8,246,453 B2 | 8/2012 | St. John et al. | | |
| 8,285,541 B2* | 10/2012 | Brun | ............ | G06F 17/275 704/1 |
| 8,606,564 B2* | 12/2013 | Merugu | ............ | G06F 17/30864 704/9 |
| 8,762,853 B2* | 6/2014 | Spielberg | ............ | G06F 3/165 715/228 |
| 8,867,549 B2* | 10/2014 | Chaturvedi | ............ | H04L 63/102 370/395.2 |
| 9,037,450 B2* | 5/2015 | Vukosavljevic | ............ | G06F 17/211 348/564 |
| 9,111,545 B2* | 8/2015 | Jadhav | ............ | H04M 1/72547 |
| 9,223,853 B2* | 12/2015 | Shukla | ............ | G06F 17/30672 |
| 9,256,651 B1* | 2/2016 | Joyce | ............ | G06F 3/04847 |
| 9,276,855 B1* | 3/2016 | Mengle | ............ | H04L 47/00 |
| 2002/0143523 A1* | 10/2002 | Balaji | ............ | G06F 17/2205 704/8 |
| 2003/0135831 A1* | 7/2003 | Hsiao | ............ | G06F 17/5081 716/112 |
| 2004/0015309 A1* | 1/2004 | Swisher | ............ | H04L 41/0813 702/79 |
| 2004/0122979 A1* | 6/2004 | Kirkland | ............ | G06F 17/2205 709/247 |
| 2004/0260833 A1* | 12/2004 | Rachlin | ............ | H04L 41/12 709/238 |
| 2006/0112175 A1* | 5/2006 | Sellers | ............ | H04L 12/2602 709/223 |
| 2006/0197764 A1* | 9/2006 | Yang | ............ | G06T 13/80 345/473 |
| 2006/0230011 A1* | 10/2006 | Tuttle | ............ | G06F 17/30864 706/62 |
| 2007/0179776 A1* | 8/2007 | Segond | ............ | G06F 17/2247 704/9 |
| 2007/0266331 A1* | 11/2007 | Bicker | ............ | G06F 17/245 715/764 |
| 2008/0059491 A1* | 3/2008 | Gatti | ............ | G06F 17/30569 |
| 2008/0221867 A1* | 9/2008 | Schreiber | ............ | G06Q 30/0273 704/8 |
| 2009/0006097 A1* | 1/2009 | Etezadi | ............ | G10L 13/08 704/260 |
| 2009/0192968 A1* | 7/2009 | Tunstall-Pedoe | ............ | G06N 5/02 706/47 |
| 2010/0042414 A1 | 2/2010 | Lewis et al. | | |
| 2012/0290299 A1 | 11/2012 | Basson et al. | | |
| 2013/0132091 A1* | 5/2013 | Skerpac | ............ | G10L 17/005 704/273 |
| 2013/0215120 A1* | 8/2013 | Cornell | ............ | G06T 11/203 345/470 |
| 2014/0229155 A1* | 8/2014 | Leydon | ............ | G06Q 30/0217 704/2 |
| 2015/0169314 A1* | 6/2015 | Dicks | ............ | G06F 8/61 713/2 |
| 2016/0182617 A1* | 6/2016 | Mengle | ............ | H04L 47/00 709/219 |
| 2016/0357732 A1* | 12/2016 | Hsu | ............ | G06F 17/289 |

OTHER PUBLICATIONS

Brown, Adding Linguistic Knowledge to a Lexical Example-based Translation System, Google 1999, pp. 22-32.*

Lienhart et al., Localizing and Segmenting Text in Images and Videos, IEEE 2002, pp. 256-268.*

European Patent Office, International Search Report & Written Opinion Issued in PCT Patent Application No. PCT/US2014/031072, Dec. 17, 2014, 10 Pages.

Language Plural Rules, The Unicode Consortium, http://unicode.org/repos/cldr-tmp/trunk/diff/supplemental/language_plural_rules.html, Mar. 1, 2012, 10 pages.

Special Topics: Internationalization, yiiframework, http://web.archive.org/web/20130304132301/http://www.yiiframework.com/doc/guide/1.1/en/topics.i18n, Mar. 4, 2013, 8 pages.

IPEA European Patent Office, Written Opinion of the International Preliminary Examining Authority Issued in Application No. PCT/US2014/031072, Apr. 30, 2015, WIPO, 8 Pages.

IPEA European Patent Office, International Preliminary Report on Patentability Issued in Application No. PCT/US2014/031072, Jul. 22, 2015, WIPO, 9 pages.

Beatty, Jef, "L20n Examples for Localizers", Retrieved at <<http://blog.mozilla.org/l10n/2012/03/29/l20n-examples-for-localizers/>>, Mar. 29, 2012, pp. 5.

"Rails Internationalization (I18n) API", Retrieved at <<http://guides.rubyonrails.org/i18n.html>>, Retrieved Date: Dec. 19, 2012, p. 1.

"Not the User's Fault", Retrieved at <<http://jonoscript.wordpress.com/2008/10/01/%E3%83%90%E3%83%93%E3%83%AB%E3%81%AE%E5%A1%94/>>, Published Date: Oct. 1, 2008, pp. 12.

"Plural Format", Retrieved at <<http://icu-project.org/apiref/icu4j/com/ibm/icu/text/PluralFormat.html>>, Retrieved Date: Dec. 19, 2012, p. 1.

"Translate for your Language", Retrieved at <<http://ocpsoft.org/prettytime/translate-for-your-language/>>, Dec. 5, 2012, pp. 4.

"WordPress-Codestyling Localization-Word Press Plugins", Retrieved at <<http://wordpress.org/extend/plugins/codestyling-localization/>>, Dec. 16, 2012, pp. 2.

"22.1. Gettext—Multilingual Internationalization Services", Retrieved at <<http://docs.python.org/2/library/gettext.html>>, Aug. 16, 2011, pp. 14.

The State Intellectual Property Office of China, Office Action Issued in Chinese Patent Application No. 201480016850.9, dated Feb. 20, 2017, China, 8 pages. (Submitted with English Summary of Objections Raised in the Office Action).

* cited by examiner

FLEXIBLE PLURALIZATION OF LOCALIZED TEXT

BACKGROUND

A computer operating system, application, service, or other program may be developed for use in more than one geographic region. Such a program may communicate with its users through text displayed on a user interface (UI). To provide a positive user experience, the program may be configured to communicate in the user's own language. In some examples, a program preparing to present communication to a user will pass an argument to a UI procedure, the argument specifying the content of the communication. The procedure, aware of the user's language preference and/or the region in which the program is being used, returns a pointer to the specified content in the appropriate language. The program then may direct communication in the user's language to the appropriate UI element, such as a dialog box on a display monitor.

In the above scenario, the pointer may point to a location in a resource file accessible to the UI procedure. The resource file may be prepared with assistance from an expert in the user's language, so that the communication is formulated with correct grammar, spelling, and punctuation.

SUMMARY

One embodiment of this disclosure provides machine-readable memory encoding a localization resource for a computer system. The localization resource comprises an array of delimited strings, each string including a range to be compared to a content limiter by the computer system. Associated with the range is text to be presented on a user interface of the computer system if the content limiter is within the range. A localization resource of this format may provide, among other features, the ability to handle complex pluralization rules across a broad range of languages.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
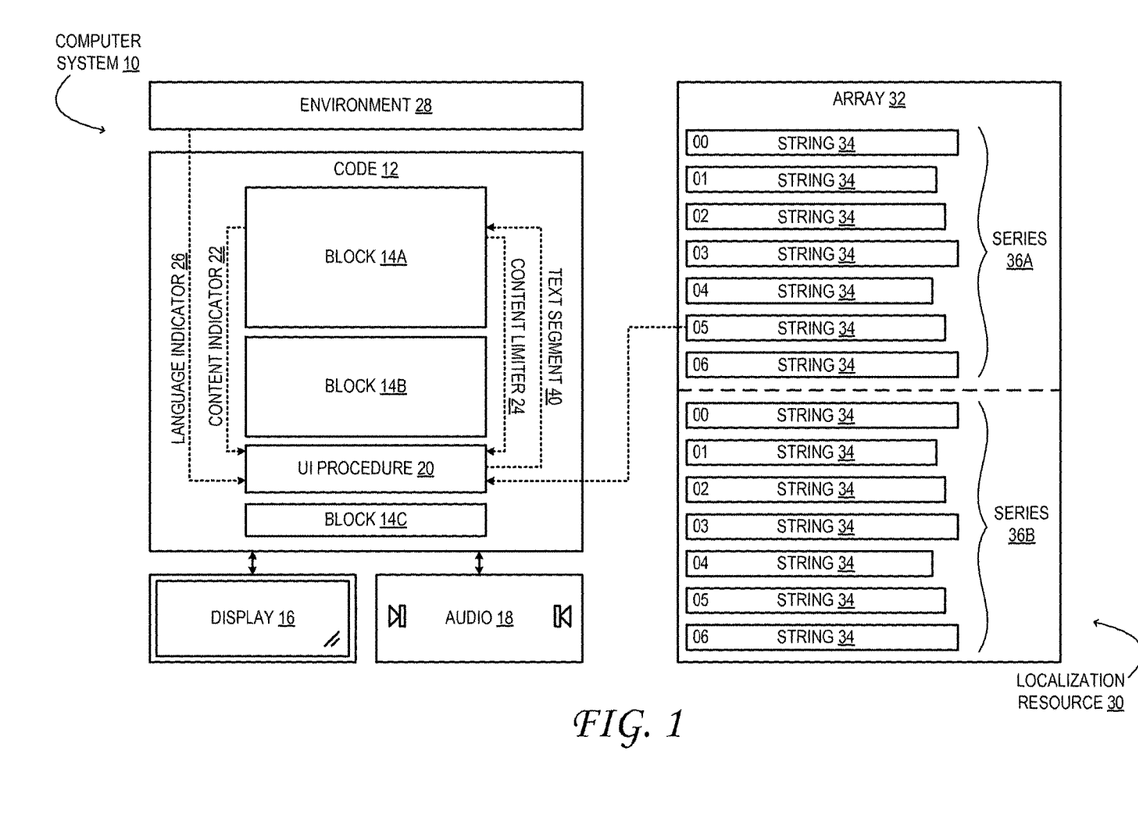
FIG. 1 shows aspects of an example computer system and a localization resource in accordance with an embodiment of this disclosure.

FIG. 1 shows aspects of an example computer system 10. Computer system 10 may represent any suitable type of computer system, including but not limited to a video game system, a desktop, laptop or tablet computer system, a smartphone, media player or other handheld device, etc. Via suitable logic and instruction-storage componentry, computer system 10 is configured to store and execute code 12. The code may be implemented, for example, as software in volatile or non-volatile memory of the computer system and/or accessed over a network. In other example embodiments, the code may be instantiated as firmware or directly in the hardware of the computer system—e.g., in a so-called application-specific integrated circuit (ASIC) or system-on-a-chip.

In the embodiment of FIG. 1, code 12 is divided into a number of code blocks 14. Any such block may correspond to an operating system (OS) of computer system 10, to an application such as a video game or media-player application, or to a service or other computer program. Any, some, or all of the code blocks may include code that presents communication to a user—e.g., through a UI of the computer system. Accordingly, the computer system of FIG. 1 includes certain UI components, such as display monitor 16 and audio interface 18, as non-limiting examples.

In the scenario illustrated in FIG. 1, executing code block 14A may encounter an instruction to present communication to the user. In one example scenario, the executing code may be a media-player application which has downloaded several music tracks from a remote server. Code block 14A may be charged with reporting, in this instance, that four tracks have been downloaded. Naturally, it is desirable that any communication presented to the user be formulated in the user's own language, with spelling and word choice appropriate for the user's geographic region. To that end, language-agnostic code block 14A may issue a call to UI procedure 20. For example, in some embodiments, the call may pass at least two arguments to the UI procedure: content indicator 22 and content limiter 24. The content indicator may be a numeric value that indicates, with some level of generality, the content of the communication. In the above example, a content indicator of '05' may indicate that one or more music tracks have been downloaded, without specifying the number of tracks. The content limiter provides further specificity to limit the content of the communication. In some embodiments, the content limiter may specify a number or amount of an item recited in the communication. For instance, a content limiter of '4' may specify that four is the number of music tracks that were downloaded.

In addition to content indicator 22 and content limiter 24, UI procedure 20 of FIG. 1 has access to language indicator 26. The language indicator may be a global variable stored in environment 28 of computer system 10. The language indicator specifies the language preference of the user of computer system 10 and/or the region in which the computer system is being used. A language indicator '00', for example, may indicate that the user's language preference is English with spelling and word choice appropriate for the United Kingdom.

In the embodiment of FIG. 1, UI procedure 20 retrieves text corresponding to the indicated content and language of the communication from localization resource 30. The localization resource may be a file, bit stream, or other object accessible to the UI procedure. It may provide text, correctly formulated in the user's language and/or regional preference, for any communication that code 12 may seek to present.

As shown in FIG. 1, localization resource 30 may comprise an array 32 of strings 34. The term 'string' refers herein to a data type comprising a sequence of one or more characters. A 'character' is data type that represents an elementary language symbol, such as an alphanumeric symbol, punctuation or diacritical mark, or white space. Characters may be ASCII or unicode, for example. Continuing in FIG. 1, the strings of array 32 may be arranged in two or more series 36, based on language. For example, series 36A may include strings formulated in UK English, and series 36B may include strings formulated in Russian. The strings of each series are indexed numerically; those with the same numerical index express the same content in different languages. Accordingly, UI procedure 20 may preselect a series of strings of the language indicated by language indicator 26, and from the preselected series select the string whose index matches content indicator 22. Desired content from the selected string may be revealed through subsequent processing, as described hereinafter.

Although two series of strings—i.e., languages—are represented in FIG. 1, localization resource 30 is extensible to any number of languages, and remains useful even when strings of only one language are included. When two or more languages are supported in the localization resource, corresponding series of strings may include the same number of strings—e.g., 500 strings in the UK English series, and 500 corresponding strings in the Russian series. In this format, string array 32 is said to be non-jagged across the various languages it supports.

Figure 2:
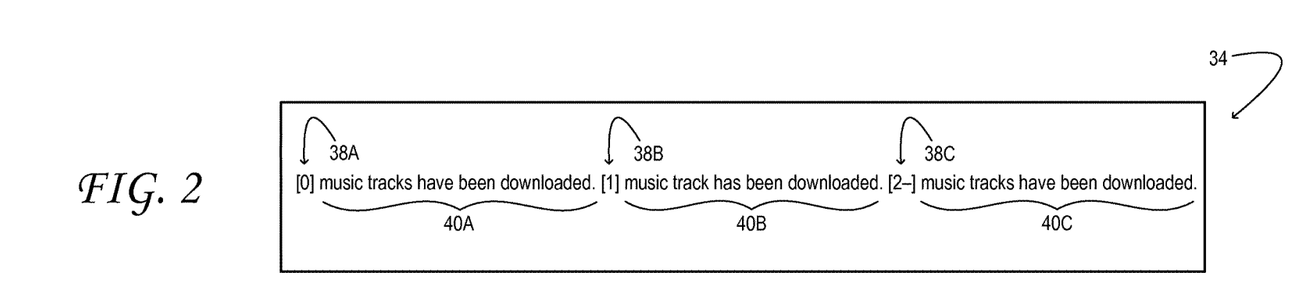
FIGS. 2 through 5 show aspects of example strings of a localization resource array in accordance with an embodiment of this disclosure.

FIG. 2 shows aspects of an example string 34 of a localization resource 30. Generally speaking, each string includes at least one range 38 to be compared to content limiter 24. Associated with each range is a text segment 40 to be presented on a user interface of the computer system if content limiter 24 is within the range. In the example of FIG. 2, the illustrated string includes three different ranges 38 and a corresponding text segment 40 associated with each range. Here, the different text segments of the string recite the item 'music track' in different pluralization forms, each form appropriate for its associated numeric range. Moreover, the verb form used in each text segment is modified to agree with the number of downloaded music tracks. In the example of FIG. 2, each text segment 40 is a complex phrase having a subject and a predicate. In other examples, the text segments of string 34 may include only one word apiece—e.g., a pluralizable noun or a verb whose form changes depending on the pluralization state of its subject. In still other examples, the text segments of string 34 may include a plurality of complex phrases or complete sentences.

In the example of FIG. 2, the various ranges are represented as delimited substrings of string 34, with square brackets serving as the delimiters. Naturally, any other suitable delimiters may be used instead. In this example, the delimited substring representing a given range 38 is adjacent to the text segment 40 associated with that range. More specifically, the delimited substring precedes the associated text segment. In other examples, the range may follow its associated text segment or be located elsewhere in the string. In still other examples, additional delimiters may be used to group each range together with its associated text segment, e.g.,

[[0] music tracks][[1] music track][[2-] music tracks]

In the example of FIG. 2, ranges 38A and 38B are single-valued ranges, while range 38C is an open-ended range. Range 38C includes a lower limit but no upper limit: it specifies that content limiter 24 will match the range if it equates to two or greater. In other examples, a range may include an upper limit, but no lower limit—e.g., [-5], to specify that the content limiter may be any number up to and including the number 5. In still other examples, a range may includes a wildcard character to stand for one or more numeric characters. For instance, [1?] may stand for 10, 11, . . . 19, while [1*] may stand for any number beginning with 1, and [*1] may stand for any number ending in 1.

Figure 3:
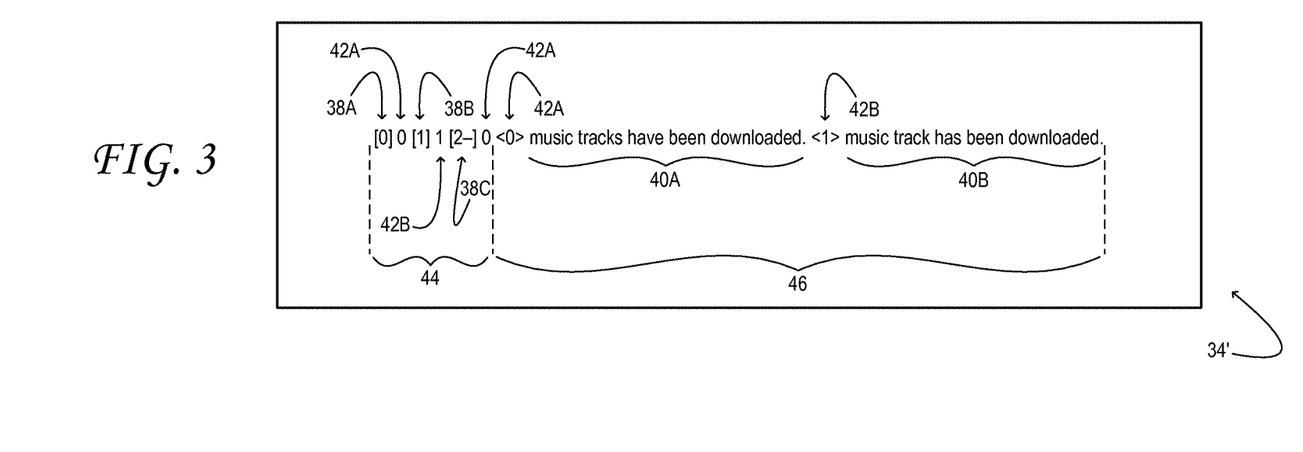

FIG. 3 shows aspects of another example string 34' of the same or different localization resource 30. Here again, each string includes a plurality of ranges 38 to be compared to content limiter 24, and a corresponding plurality of text segments 40. In the embodiment of FIG. 3, however, the delimited substring representing a given range is adjacent to a token 42 that stands for the associated text segment. In the specific example illustrated, string 34' includes a rangefinder substring 44 and an assignment substring 46. In the rangefinder substring, each delimited substring representing a range 38 is adjacent to a token 42. In the assignment string, all the tokens used in the rangefinder substring are again listed, this time adjacent to the text segment to which they are assigned. In FIG. 3, the tokens of the assignment string appear in angle brackets, but again, any other suitable delimiters may be used instead. Accordingly, strings 34 and 34' represent alternative string formulations.

In embodiments as shown in FIGS. 2 and 3, it is understood that the actual number corresponding to content limiter 24 may be prepended to the appropriate text segment retrieved from the string, for display purposes. Thus, the display may receive text that reads, e.g., "10 items have been downloaded.", or "Ten items have been downloaded.", etc. In other embodiments, however, the token concept may be extended such that the number corresponding to the content limiter is already present in the retrieved text segment. In this string, for example,

[[0]{0} songs][[1]{0} song][[*]{0} song]

the token {0} stands for the number corresponding to the content limiter. An advantage of this feature is that it may be desirable to express the number differently depending on its range or value. For instance, it may be more natural for a UI interface to display "No songs match your query.", as opposed to "0 songs match your query." This feature may be enacted by including the alternative substring

[[0] no song]

in the example string above.

Figure 4:
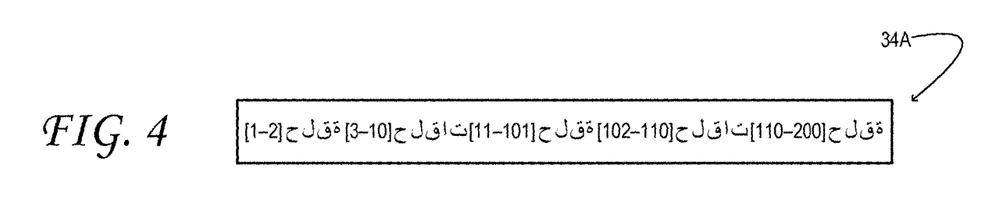
Figure 5:
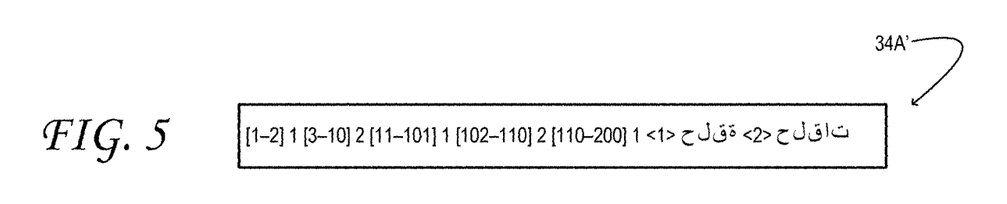

For embodiments directed to pluralization of localized content, it will be noted that some languages may have quite complex pluralization rules. FIGS. 4 and 5 show string representations that may be used to construct grammatically correct sentences involving the word 'episode' in a popular Arabic dialect. In these examples, the text segment associated with each numerical range recites the single word 'episode' in the grammatically correct form for that range. FIG. 4 uses the more verbose structure introduced in FIG. 2, while FIG. 5 presents the same content using rangefinder and assignment substrings, as in FIG. 3. Complex pluralization rules are also used in other languages, such as Russian.

A localization resource of the format here disclosed may provide significant advantages over strategies that merely include different localized text strings for content limiters equating to 0, 1, and >1. For example, such an approach may be too limiting natively to provide grammatically correct pluralization in Arabic or Russian. Furthermore, even if one were to extend the approach to include additional ranges for languages that utilize them, the resulting series of may not easily be incorporated into arrays that also include an English or romance-language series. Such an array would be jagged across the languages it represents, having more string entries for one language series than for another.

No aspect of the forgoing description should be understood in a limiting sense, for numerous other implementations remain within the spirit and scope of this disclosure. In general, localization resource 30 may comprise virtually any array of delimited strings, each string including a range to be compared to a content limiter by a computer system, and associated with the range, text to be presented on a user interface of the computer system if the content limiter is within the range. As an alternative to the string structures shown in FIGS. 2 and 3, the array may include range and text elements combined into a so-called 'regular expression'. For instance, as an alternative to this tokenized string:

[[1]{0} song][[*2]{0} songz][[*3]{0} songz][[*4]{0} songz][[*]{0} songs]

the following regular expression may be stored in the array:

[[^$]{0} song][[^(2-4)]{0} songz][[\d]$]{0} songs]

Furthermore, although some aspects of this disclosure are directed to pluralization of localized content, the approach set forth herein is also applicable to other problems in software localization, such as expressing the time of day. In Russian, for example, the term ' часов ' (chasov) is used like o'clock in English, but with exceptions. If the time ends in the numeral 1, then ' час ' (chas) is used instead, and if the time ends in 2, 3, or 4, then 'часа ' (chasa) is used.

The configurations described herein enable various methods involving localization resource 30. Accordingly, some such methods are now described, by way of example, with continued reference to the above configurations. It will be understood, however, that the methods here described, and others within the scope of this disclosure, may be enabled by other configurations as well. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 6:
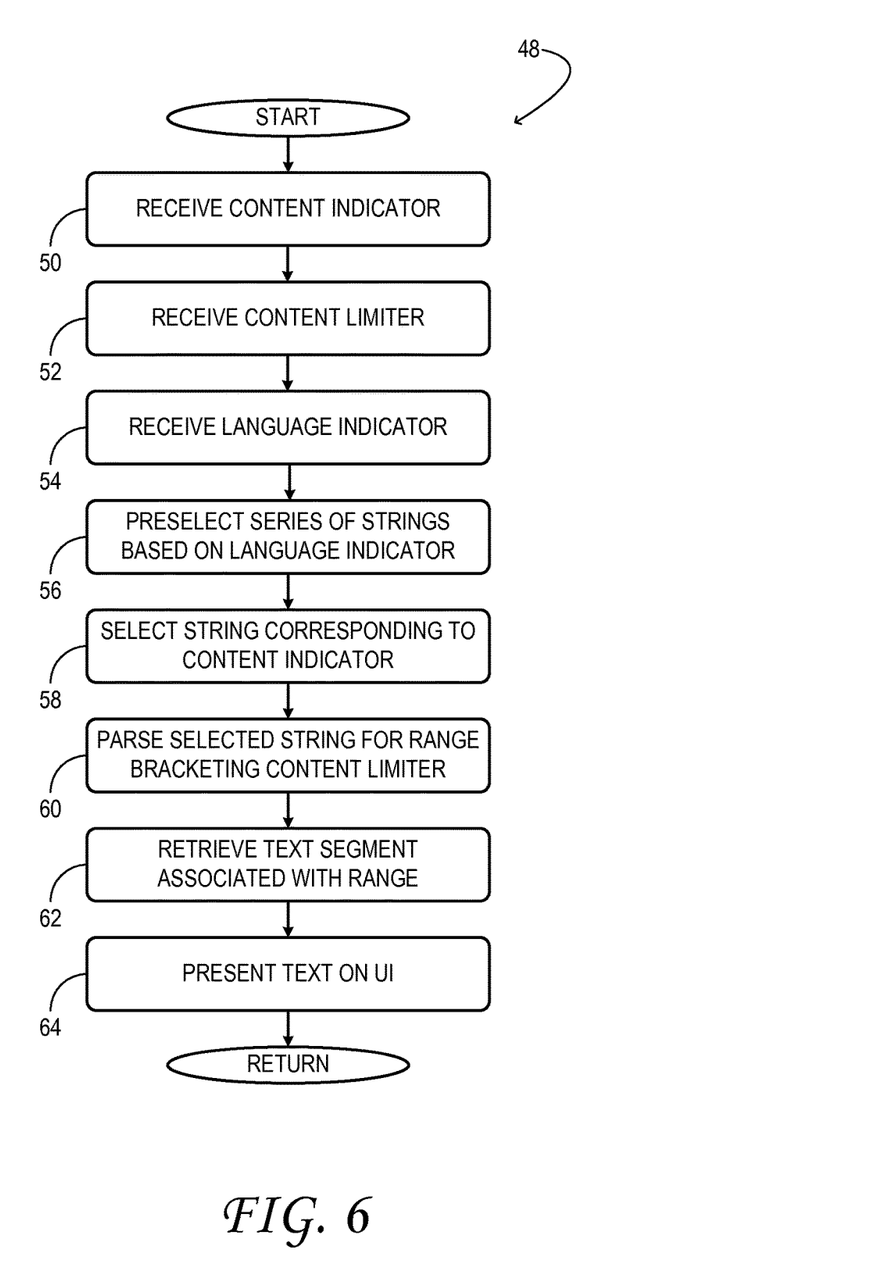
FIG. 6 illustrates an example method to retrieve grammatically accurate text from a localization resource on a computer system in accordance with an embodiment of this disclosure.

FIG. 6 illustrates an example method 48 to retrieve grammatically accurate text from a localization resource on a computer system. At 50 of method 48, a content indicator that indicates the content of the text to be retrieved is received in the computer system. In one embodiment, the content indicator may be passed from an executing code block of the computer system to a UI procedure of the computer system. At 52 a content limiter that imposes a limitation on the indicated content is received. Here again, the content limiter may be passed from an executing code block of the computer system to a UI procedure. At 54 a language indicator is received in the UI procedure. The language indicator indicates a language preference of a user of the computer system or a location in which the computer system is being used. In one embodiment, the language indicator may be a global environment variable, or a variable shared with the UI procedure.

At 56 of method 48, a series of strings formulated in the user's language is preselected from localization resource 30 based on language indicator 26. At 58 a string 34 corresponding to content indicator 22 is selected from the preselected series. At 60 the selected string is parsed to find a range that brackets content limiter 24.

The string may be parsed from left to right, in some embodiments. Accordingly, it the various ranges 38 included in each string may be arranged in order of increasing generality, from left to right. In this manner, the content limiter will be matched to the narrowest matching range in preference to a more generic (e.g., open-ended or wildcard) range, if present in the string. At 62 a text segment 40 associated with the found range is retrieved. In one embodiment, the UI procedure called by the executing code block may return a pointer to the text segment. At 64 the text segment is presented on a UI of the computer system. This action may include displaying the text segment on a UI element such as a dialog box of a display monitor of the computer system. In other embodiments, the text segment may be output to a text-to-speech engine of the computer system, or presented in any other suitable manner.

Figure 7:
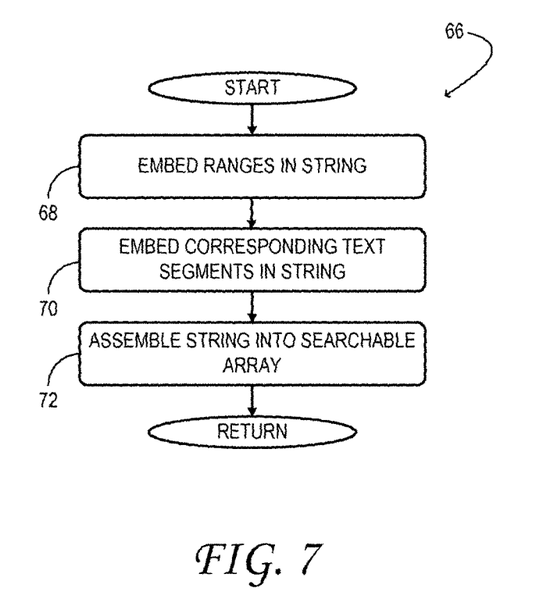
FIG. 7 illustrates an example method to prepare a localization resource for a computer system in accordance with an embodiment of this disclosure.

FIG. 7 illustrates an example method 66 to prepare a localization resource for a computer system. At 68 of the method, a plurality of ranges 38 are stored, embedded as delimited substrings into a string 34. The ranges may be numeric, as described above. At 70 a corresponding plurality of text segments 40 are also storably embedded into the string, each text segment to be presented on a user interface of a computer system if a content limiter 24 received in the computer system is within the range associated with that text segment.

In one embodiment, the content limiter may represent a number or amount of an item recited commonly in the plurality of text segments of the string. In one embodiment, storing the delimited string may include embedding different text segments that recite the item in different pluralization forms, each form appropriate for its associated numeric range. At 72, the string is assembled into a searchable array 32 of localization resource 30.

As evident from the foregoing description, the methods and processes described herein may be tied to a computing system of one or more computing devices. Such methods and processes may be implemented as a computer-application program or service, an application-programming interface (API), a library, and/or other computer-program product.

Figure 8:
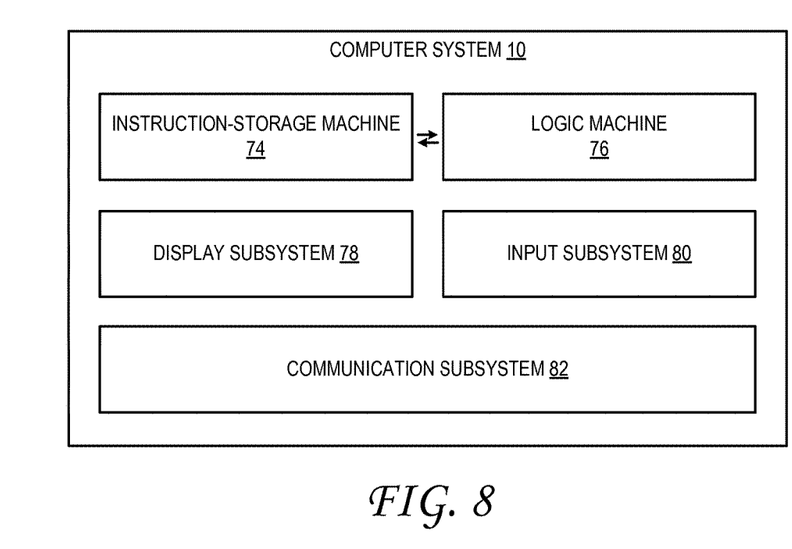
FIG. 8 shows a block diagram of a computer system in accordance with an embodiment of this disclosure.

FIG. 8 is a high-level diagram showing additional aspects of computer system 10, which is configured to support the methods and processes described herein. As noted hereinabove, the computer system includes a logic machine 74 and an instruction-storage machine 76. Computer system 10 may optionally include a display subsystem 78, an input subsystem 80, a communication subsystem 80, and/or other components not shown in FIG. 8.

Logic machine 74 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 74 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Instruction-storage machine 76 includes one or more physical devices configured to hold instructions executable by logic machine 74 to implement the methods and processes described herein. When such methods and processes are implemented, the state of the instruction-storage machine may be transformed—e.g., to hold different data. The instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The instruction-storage machine may include volatile, nonvolatile, dynamic, static, read/write, read-only, random-access, sequential-access, location-addressable, file-addressable, and/or content-addressable devices.

It will be appreciated that instruction-storage machine 76 includes one or more physical devices. However, aspects of the instructions described herein alternatively may be propagated by a communication medium (e.g., an electromagnetic signal, an optical signal, etc.) that is not stored via a storage medium.

Aspects of logic machine 74 and instruction-storage machine 76 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'program' or 'engine' may be used to describe an aspect of computer system 10 implemented to perform a particular function. In some cases, a program or engine may be instantiated via logic machine 74 executing instructions held by instruction-storage machine 76. It will be understood that different programs or engines may be instantiated from the same application, service, code block, object, library, routine, API, function, etc. Likewise, the same program, and/or engine may be instantiated by different applications, services, code blocks, objects, routines, APIs, functions, etc. The terms 'program' or 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display subsystem 78 may be used to present a visual representation of data held by instruction-storage machine 76. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with logic machine 74 and/or instruction-storage machine 76 in a shared enclosure, or such display devices may be peripheral display devices.

When included, input subsystem 80 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 82 may be configured to communicatively couple computer system 10 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computer system 10 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a computer system, a method to retrieve grammatically accurate text from a localization resource, the method comprising:
    receiving a content indicator that indicates the content of the text to be retrieved;
    receiving a content limiter that imposes a limitation on the content;
    selecting from the localization resource a string corresponding to the content indicator, the localization resource comprising a plurality of strings, each string comprising a sequence of one or more characters and each string including:

associated with the content indicator, a first range to be compared to the content limiter, wherein the first range is delimited as a first substring of the string, associated with the first range, a first text segment to be presented on a user interface of the computer system if the content limiter is within the first range, associated with the content indicator, a second range to be compared to the content limiter, wherein the second range is delimited as a second substring of the string, and associated with the second range, a second text segment to be presented on the user interface if the content limiter is within the second range;

parsing the selected string to determine which of the first and second ranges brackets the content limiter; and retrieving from the string the text segment associated with the range as determined.

2. The method of claim 1 wherein the content indicator is numeric.

3. The method of claim 1 wherein the content limiter specifies a number or amount of an item recited in the text, and wherein the range is a numeric range.

4. The method of claim 3 wherein the first and second ranges are among a plurality of ranges of a given string to be compared to the content limiter, wherein the first and second text segments are among an associated plurality of text segments to be presented on the user interface, and wherein the different text segments of the given string recite the item in different pluralization forms, each form appropriate for its associated numeric range.

5. The method of claim 1 wherein the first range comprises a single-valued range.

6. The method of claim 1 wherein the first range includes an upper limit and/or a lower limit.

7. The method of claim 1 wherein the first range comprises a wildcard character to stand for one or more numeric characters.

8. The method of claim 1 wherein the first substring is adjacent to the first text segment.

9. The method of claim 8 wherein the first substring precedes the first text segment.

10. The method of claim 1 wherein the first sub string is adjacent to a token that stands for the first text segment.

11. The method of claim 10 wherein the string includes a rangefinder substring and an assignment substring, wherein the token is adjacent to the first range in the rangefinder substring and adjacent to the first text segment in the assignment substring.

12. The method of claim 1 further comprising presenting the text on a user interface of the computer system.

13. The method of claim 1 further comprising outputting the text to a speech engine of the computer system.

14. The method of claim 1 wherein the plurality of strings is incorporated into an array, the method further comprising:

receiving a language indicator that indicates a language preference of a user of the computer system or a location in which the computer system is being used; and preselecting a series of strings of the array based on the language indicator.

15. A machine-readable memory encoding a localization resource for a computer system, the resource comprising:

a plurality of delimited strings, each string including a sequence of one or more characters and each string including:

a first range to be compared to a content limiter by the computer system, the first range delimited as a first substring of the string, associated with the first range, a first text segment to be presented on a user interface of the computer system if the content limiter is within the first range, wherein the first substring is adjacent to a token that stands for the first text segment, wherein the string includes a rangefinder substring and an assignment substring, and wherein the token is adjacent to the first range in the rangefinder substring and adjacent to the first text segment in the assignment substring, a second range to be compared to the content limiter, wherein the second range is delimited as a second substring of the string, and associated with the second range, a second text segment to be presented on the user interface if the content limiter is within the second range.

16. The machine-readable memory of claim 15 wherein the plurality of strings includes text in two or more languages and is non-jagged across the two or more languages.

17. The machine-readable memory of claim 15 wherein the included first range and first text segment are combined into a regular expression.

18. On a computing system, a method for preparing a localization resource, the method comprising:

storing a delimited string, the string including a sequence of one or more characters and including a plurality of numeric ranges delimited as a plurality of substrings in the string, the string corresponding to a content indicator;

storably embedding in the string the plurality of substrings and an associated plurality of text segments, each text segment to be presented on a user interface of the computer system if a numeric content limiter received in the computer system is within the numeric range delimited as a substring associated with that text segment, the content limiter representing a number or amount of an item recited commonly in the plurality of text segments; and incorporating said string, together with other strings corresponding to other content indicators, into a searchable array of the localization resource.

19. The method of claim 18 wherein storably embedding the associated plurality of text segments in the string includes embedding in the string different text segments that recite the item in different pluralization forms, each form appropriate for its associated numeric range.

* * * * *